Aug. 9, 1955
S. GARGANO
2,714,862
ICE CREAM DIPPER
Filed July 3, 1953
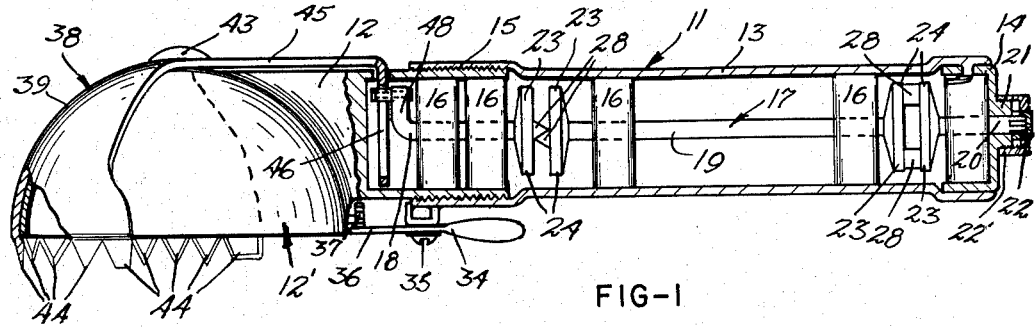
FIG-1
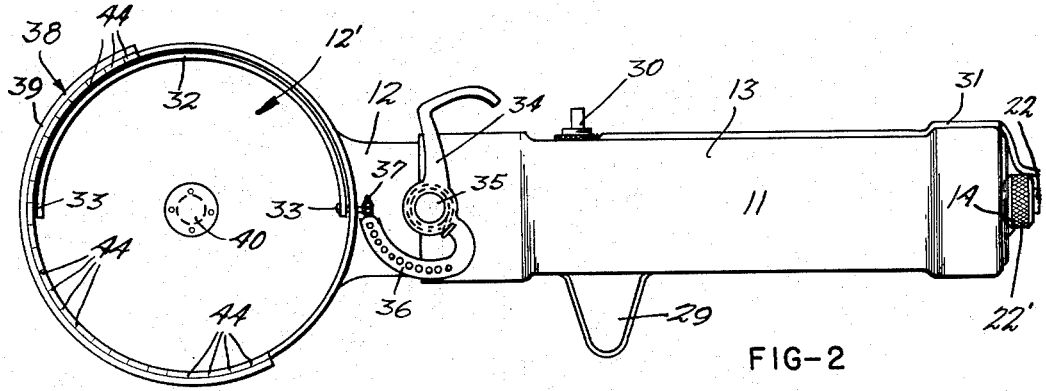
FIG-2
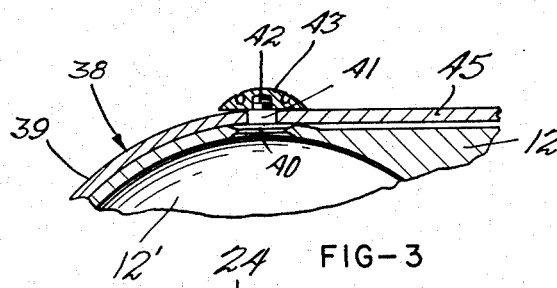
FIG-3
FIG-5
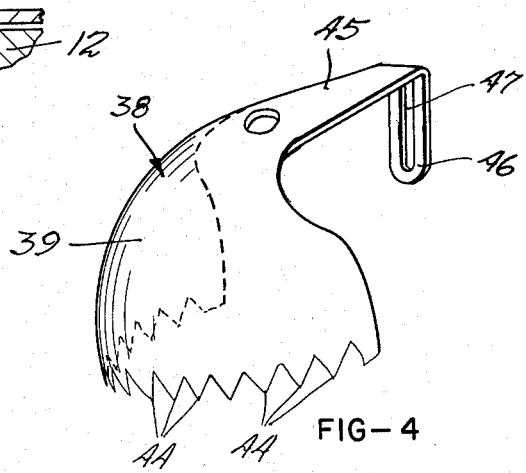
FIG-4
INVENTOR.
Sam Gargano
BY
Glenn L. Fish
ATTORNEY United States Patent Office 2,714,862
Patented Aug. 9, 1955

2,714,862
ICE CREAM DIPPER
Sam Gargano, Spokane, Wash.
Application July 3, 1953, Serial No. 365,866
2 Claims. (Cl. 107—48)

As is well known by those skilled in the art the conventional ice cream dipper comprises a substantially hemispherical scoop or bowl connected to a handle and is provided with an ice cream discharge means for ejecting the ice cream after it is scooped therein. Presently the scoop is pushed into the ice cream by manual force, and as it is the present day practice to use young girls in fountain work, it has been found that the physical effort required to scoop the ice cream when it is frozen particularly hard is beyond the capability of many of these girls; therefore, an important object of the present invention is to provide an ice cream dipper having means associated therewith for assisting in scooping the ice cream from its container regardless of how hard the ice cream is frozen, thus reducing the physical effort required.

Another object of the invention lies in the provision of an ice cream dipper wherein the edge of the bowl of the device is provided with a power operated means for assisting the operating in scooping the ice cream from its container.

A further object of the invention is to provide an ice cream dipper with a cutting device having a spherical segment overlying the outer face of the bowl and pivotally secured to the bowl concentric with its mouth edge and being adapted for oscillating movement about its axis.

A still further object of the invention lies in the provision of a power operated ice cream dipper which is so constructed and arranged that the power means for driving the cutting device is located some distance from the ice cream dipper therefore precluding the possibility of its becoming clogged with ice cream.

Another object of the invention lies in the provision of cutting teeth on the cutting device which are beveled inwardly so as to direct the ice cream cut thereby into the bowl of the dipper.

Another object of the invention lies in the provision of an ice cream dipper having a sectional handle which facilitates disassembly of the dipper for cleaning purposes. Yet another object of the invention lies in the provision of cooperating clutch means interconnecting shaft sections which are journaled within the handle sections whereby the action of connecting the handle sections unites and separates the shaft sections simultaneously their respective handle sections.

These and other objects of the invention will become apparent during the course of the following description.

In the accompanying drawings, forming a part of this specification, and in which like numerals are employed to designate like parts:

Figure 1 is a view in side elevation showing the improved ice cream dipper with its handle in longitudinal cross section;

Figure 2 is a plan view of the improved ice cream dipper looking toward the open mouth of the bowl;

Figure 3 is a fragmentary cross section showing the journal means for pivotally uniting the cutting device to the hemispherical bowl;

Figure 4 is a perspective view of the improved cutting device; and

Figure 5 is a view upon an enlarged scale showing one end of the drive shaft and a cross section of a clutch member.

Referring more particularly to the drawing, I have shown my improved ice cream dipper as having a handle 11 which is formed in forward, intermediate and rear sections 12, 13 and 14. The forward section 12 carries the ice cream bowl indicated by the numeral 12′, and disposed on the forward end of the handle 11. The intermediate section 11 is releasably secured to the forward section 12 by any desirable means such as the one here shown at 15 to be threaded cooperating portions. However, bayonet slots and pins or other fastening means may be employed for any connection if found desirable. This type of fastening means is shown for securing the rear section 14 to the intermediate section 13 of the handle.

Each section of the handle 11 is provided internally with space sealed bearings 16, and these bearings rotatably support a sectional shaft 17 which has forward portion 18, an intermediate portion 19 and a rear portion 20.

The rear section 14 of the handle 11 is provided with an externally threaded axial boss 21 adapted to threadedly receive the collar 22′ of the flexible cable 22 whereby rotary motion is imparted to the rear portion 20 from the power source (not shown).

Where the handle sections separate it is necessary to provide means of separating the sectional shaft 17 and I therefore provide clutch members 23 on the adjoining ends of the shaft sections 18, 19 and 20. These clutch members each comprise a disc 24 having an axial internally threaded bore 25 adapted to thread onto the reduced end portion 26 of its respective shaft section. The discs are provided with a flat outer face, indicated in Figure 5 by the numeral 127, and opposed spaced triangular prismatic bosses 28 are secured or carried by the faces 27 at the diameter of each said disc and are adapted to interlock each with another of the next adjacent clutch member thus transmitting rotary motion from one shaft section to another.

The handle is also provided with a finger engaging boss 29 which permits one to control the ice cream dipper with facility. Opposed to the boss 29 I provide an off switch 30 which is interposed between the wires 31 adapted to control the motor (not shown) which drives the flexible cable 22.

The bowl is provided with a semicircular band 32 which is pivoted at 33 diametrically of the mouth of the bowl and is movable about a half-arc within the hemispherical bowl 12′ to eject the ice cream therefrom. This ejecting means is conventional on ice cream dippers and is provided with the usual thumb operated lever 34 pivoted at 35 to the handle 11 and disposed so that its rack 36 engages the pinion 37 to rotate the band 32. Upon detailed inspection it will be noted that the rack 36 in Figure 2 is out of meshing engagement with the pinion 37 thereby permitting the bowl 128 to be removed from the intermediate handle section 11, without disturbing the thumb lever 34. Obviously the thumb lever may be pivoted to the forward section 12 of the handle 11 and it would then remain at all times in meshing engagement with the pinion 37.

The forward section 12 of handle 11 carries the hemispherical bowl 12′ and releasably unites it with the intermediate section 13. A cutting device indicated in general by the numeral 38 has a spherical segment portion 39 which overlays the outer face of the bowl 12′ and is positioned opposed to the handle section 12. The cutting device is pivotally secured to the bowl concentric with its mouth for oscillating movement about the axis of the mouth, by means of a journal pin 40 which is riveted or otherwise secured to the bowl 12' and extends outwardly therefrom. The pin is provided with a portion 41 which is enlarged over the reduced threaded portion 42 and which acts as a bearing or journal for the cutting device 38.

The cutting device is secured on this journal 41 by means of a nut 43 which is externally smooth and spherical on its surface and which is provided with recesses or sockets to receive a special wrench to remove or apply the nut 43.

The lower edge of the cutting device extends beyond the mouth edge of the bowl 12' and has a plurality of teeth 44 which are beveled on their inner faces and are also offset from the normal extension of the cutting device 38 inwardly to a position where they appear to depend from the edge of the mouth of bowl 12'. As the cutting device oscillates, the teeth act to cut into the ice cream, and because they depend from the edge of the bowl 12' the ice cream is directed into the bowl rather than between the cutting device 38 and the bowl's outer face.

The cutting device is provided with a rearwardly extending rocking lever 45 which is opposed to the cutting portion or hemispherical segment 39. The rocking lever 45 is provided at its rear end with a downwardly turned arm 46 and this arm is provided with an intermediate slot 47 which extends longitudinally therein.

The forward end of the shaft section 18 is provided with a crank 48 and the crank cooperates with the slot 47 of the arm 46 so that when the shaft 17 is rotated the rocking lever is oscillated and therefore the cutting device is oscillated about its journal 41 to cause the cutting teeth to cut the ice cream and permit pressing the dipper therein to fill regardless of how hard the ice cream is.

The shaft sections 19 and 20 and the major portion of shaft section 18 are axially aligned so that a minimum of vibrations is apparent in the operating tool.

It is not my intention to unnecessarily limit my invention, and I desire to secure the invention as broadly as possible, limited only as required by the prior art and the appended claims.

Having thus described my invention I claim:

1. An ice cream dipper comprising a handle having plural cylindrical sections; a rotatable shaft section journaled coaxially within each handle section; means releasably coupling each handle section together on a common axis; cooperating clutch means carried by the shaft sections for releasably interconnecting said shaft sections when the handle sections are coupled; a crank on the forward end of the forward end one of said shaft sections; a stationary hemispherical bowl releasably carrier by the handle at the end section supporting said crank and having a mouth of circular form; a cutting device having a spherical segment overlying the outer face of said bowl opposed to said handle and pivotally secured to said bowl concentric with its mouth for oscillating movement about its axis; said cutting device having a series of teeth extending beyond the mouth edge of said bowl and being beveled on their inner faces to form sharp cutting points; and a rocking lever secured to said segment opposed to its pivotal axis and having an elongated slot operably associated with said crank; whereby rotation of said shaft sections oscillates said cutting device.

2. The invention as defined in claim 1 wherein the clutch members are discs secured coaxially to said shaft sections on their ends; each said disc having an outer flat face; and diametrically opposed triangular prismatic bosses on the faces disposed to interlock with the bosses of the next adjacent clutch member and transmit rotary motion from one shaft section to another.

References Cited in the file of this patent

UNITED STATES PATENTS

| | | |
|---|---|---|
| 2,439,125 | Bolinger | Apr. 6, 1948 |
| 2,571,729 | Lawrence | Oct. 16, 1951 |